US006280212B1

United States Patent
Nguyen et al.

(12)

(10) Patent No.: US 6,280,212 B1
(45) Date of Patent: Aug. 28, 2001

(54) PORTABLE COMPUTER DOCKING STATION WITH MOVABLE DOCKING CONNECTOR

(75) Inventors: Minh H. Nguyen, Katy; John E. Youens, Magnolia, both of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/551,689

(22) Filed: Apr. 18, 2000

(51) Int. Cl.[7] ................................................ H01R 13/62
(52) U.S. Cl. ............................................ 439/157; 361/386
(58) Field of Search ................................. 439/151, 152, 439/153, 158, 170, 171, 214, 217, 218, 957, 157; 361/383, 386

(56) References Cited

U.S. PATENT DOCUMENTS

| D. 318,466 | * | 7/1991 | Grundstrom et al. | D14/114 |
| D. 320,196 | * | 9/1991 | Carter et al. | D14/107 |
| D. 371,769 | * | 7/1996 | Shima et al. | D14/107 |
| D. 375,945 | * | 11/1996 | Shin et al. | D14/107 |
| 5,402,310 | * | 3/1995 | Penniman | 361/686 |
| 5,436,792 | * | 7/1995 | Leman et al. | 361/686 |
| 5,552,959 | * | 9/1996 | Penniman et al. | 361/686 |
| 5,604,663 | * | 2/1997 | Shin et al. | 361/683 |
| 5,790,375 | * | 8/1998 | Lee | 361/686 |
| 6,034,869 | * | 3/2000 | Lin | 361/686 |
| 6,069,790 | * | 5/2000 | Howell et al. | 361/686 |

* cited by examiner

Primary Examiner—Tulsidas Patel

(57) ABSTRACT

A docking station for a portable computer has a top side from which peripheral rib structures upwardly project and form a receiving and holding area into which the computer may be lowered in preparation for docking. The receiving and holding area complementarily receives the computer, with the rib structures preventing the computer from shifting parallel to the top docking station side. A lever structure is then manually pivoted to responsively move a docking station electrical connector relative to the stationary computer into a releasably mated relationship with a corresponding connector on the computer to complete the docking process. The rotation of the docking lever also interlocks a security latch member with the computer to block its upward removal from the docking station. A Kensington lock may be used to hold the lever in its docking orientation, and thus keep the security latch interlocked with the docked computer. The computer may subsequently be undocked by simply removing the lock and pivoting the lever back to its original position to move the docking station connector out of engagement with the computer connector.

20 Claims, 9 Drawing Sheets

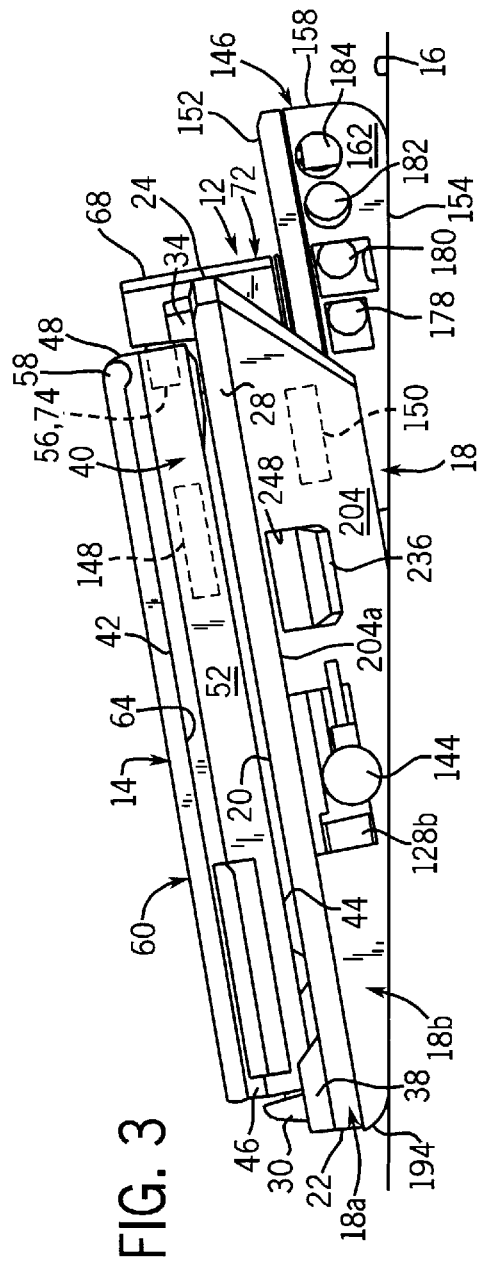
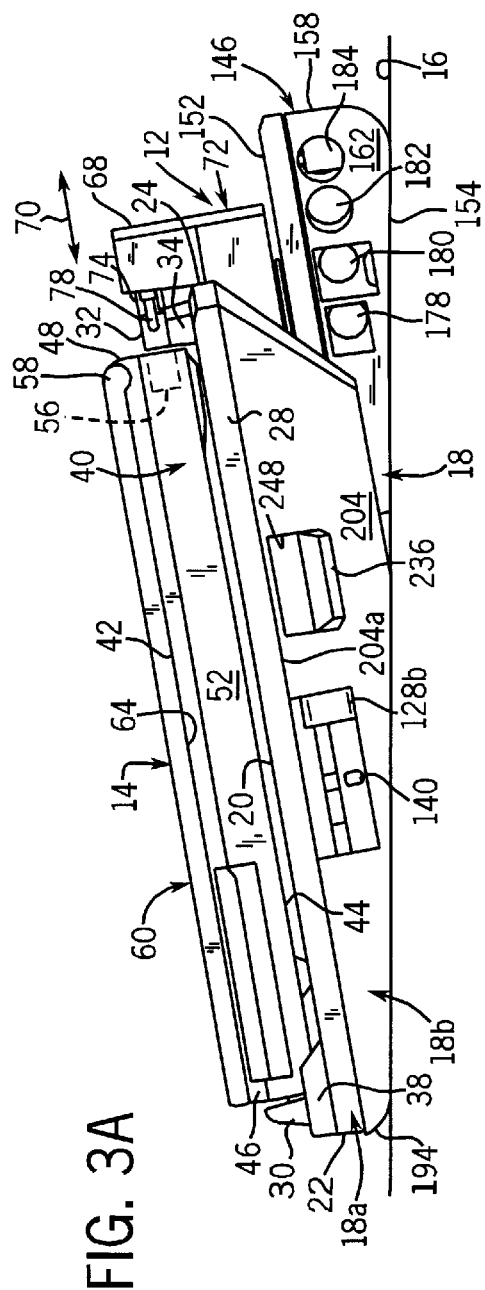

PORTABLE COMPUTER DOCKING STATION WITH MOVABLE DOCKING CONNECTOR

BACKGROUND OF THE INVENTION

1. Field of the Invention

The present invention generally relates to computer apparatus and, in a preferred embodiment thereof, more particularly relates to a docking station mateable with a portable computer and operative to couple it to desktop peripheral devices such as a keyboard, mouse and monitor.

2. Description of Related Art

In computer parlance a "docking station" is an interface device to which a portable computer, such as the increasingly popular notebook computer, may be operatively and removably coupled to connect its central processing unit and other internal circuitry to desktop computer peripheral devices such as a keyboard, monitor, printer and mouse. In this manner the portable computer may be used "on the road" by its owner, utilizing its own keyboard, monitor and pointing device, and later used in a home or office desktop work station in conjunction with the larger desktop peripheral devices which are typically considered to be more comfortable to use over extended periods of work time. Thus, a single computer can provide its user with both the compactness, light weight, portability and diminutive work space requirements of the notebook computer and the power and comfort of a desktop system with its larger workspace and peripheral devices.

A conventionally configured docking station typically comprises a housing adapted to sit atop the desktop work space and containing the interface electronics used to connect the "docked" portable computer to the desktop peripheral devices operatively coupled to the docking station. The housing has a generally horizontal surface upon which the portable computer is rested, keyboard side up, prior the to the docking operation. To dock the computer, a manual or motorized system is used to engage it and move it rearwardly along the top side of the docking station to forcibly mate an electrical connector on the moving computer with a stationary electrical connector on the docking station.

Particularly in a motorized docking system, this need to engage and move the computer along the docking station housing on which it initially rests tends to undesirably increase both the mechanical complexity of the docking system and the force required to effect the docking process. In turn, this tends to increase the cost of producing a given docking station, and the difficulty and expense of subsequently maintaining it.

In view of this it can readily be seen that a need exists for an improved technique for operatively mating a portable computer to an associated docking station. It is to this need that the present invention is directed.

SUMMARY OF THE INVENTION

In carrying out principles of the present invention, in accordance with a preferred embodiment thereof, a specially designed docking station is provided for use in operatively coupling a portable computer, having a first electrical docking connector structure thereof, to at least one desktop computer peripheral device. The docking station includes a housing having a wall portion with an area upon which the portable computer may be supported, and a holding structure associated with the wall portion and operative to stationarily restrain the supported portable computer against appreciable movement relative to the housing parallel to the wall portion area.

A second electrical docking connector structure is carried by the housing for movement relative thereto toward and away from the wall portion area and is releasably mateable with the first electrical docking connector. A force exerting structure is linked to the second electrical docking connector structure and is operative to selectively drive it relative to the housing into and out of mating engagement with the first electrical docking connector structure of the supported portable computer when it is stationarily restrained on the wall portion area by the holding structure. Preferably, the second electrical docking connector structure is movable relative to the housing in directions parallel to the wall portion area.

In a preferred embodiment of the docking station the wall portion is a top side wall portion of the housing and has peripheral edge portions, and the holding structure includes upwardly projecting rib structures disposed on the peripheral edge portions and bounding with the wall portion area an open-topped receiving area configured to downwardly and complementarily receive the portable computer base housing. Illustratively, the top side wall portion has a generally rectangular shape with front, rear, left and right side edge portions, and the rib structures project upwardly from each of the front, rear, left and right side edge portions.

The force exerting structure illustratively includes a manually operable lever member pivotally connected to the docking station housing and drivingly coupled to the movable second electrical docking connector structure, the lever member having a manually graspable outer end portion projecting outwardly from the housing and being movable between docking and undocking limit positions. According to another aspect of the invention, the housing has an exterior lock opening positioned adjacent the lever member outer end portion and to which a lock member may be connected to block movement of the lever member outer end portion from its docking limit position to its undocking limit position.

In accordance with another feature of the invention the docking station further comprises a security latch member linked to the second electrical docking connector structure for driven movement therewith relative to the housing. The security latch member is operative to engage the stationarily supported portable computer and releasably prevent its removal from the wall portion area, in a direction transverse thereto, when the second electrical docking connector structure is releasably mated with the first electrical docking connector structure.

The docking station housing is restable on a horizontal support surface and, in accordance with yet another aspect of the invention, the docking station further comprises a tilt adjustment mechanism movably carried by the housing and engageable with the support surface in a manner selectively varying the angle of the wall portion relative to the support surface.

BRIEF DESCRIPTION OF THE DRAWINGS

FIG. 3 is an enlarged scale right side elevational view of the docking station and portable computer shown in FIG. 2;

FIG. 3A is a view similar to that in FIG. 3, but with a movable docking connector portion of the docking station being rearwardly shifted out of engagement with the stationary portable computer;

DETAILED DESCRIPTION

Figure 1:
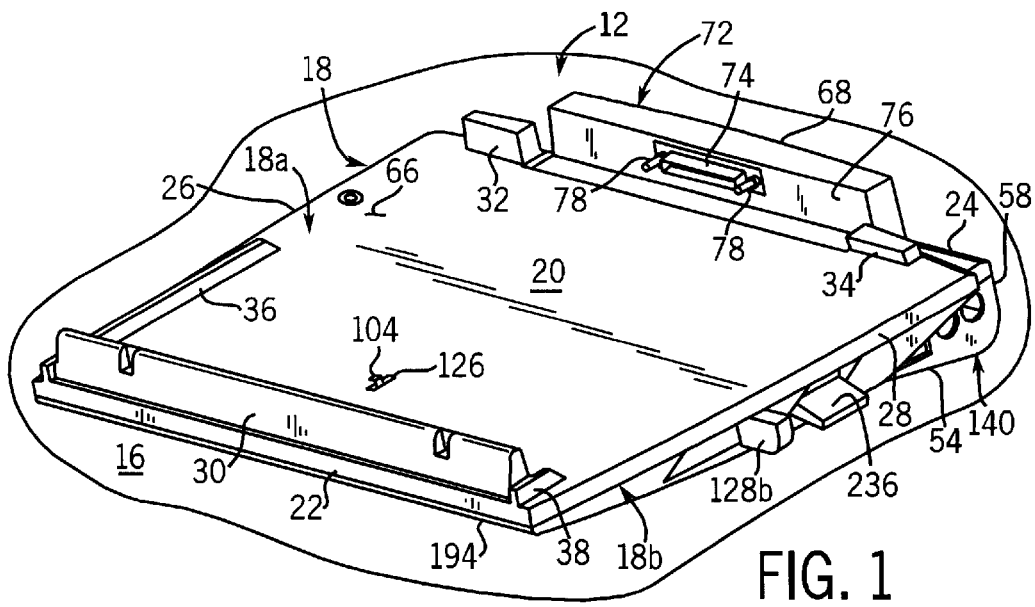
FIG. 1 is a perspective view of a portable computer docking station embodying principles of the present invention, the docking station being in a pivotally lowered orientation.

Perspectively illustrated in FIG. 1 is a specially designed docking station 12 which embodies principles of the present invention and is operative to electrically couple a portable notebook computer 14 (see FIG. 2) to desktop peripheral devices (not shown) such as a keyboard, monitor, mouse and printer. The docking station 12 is restable on a horizontal support surface, such as the illustrated desktop 16, and includes a generally rectangular hollow housing 18 having separable upper and lower sections 18a and 18b. Upper housing section 18a has a top side 20, opposite front and rear side edge portions 22 and 24, and opposite left and right side edge portions 26 and 28.

Various restraining ribs project upwardly from these side edge portions, including a front restraining rib 30 projecting upwardly from the front side edge portion 22 and longitudinally extending along nearly its entire length, a pair of rear restraining ribs 32,34 projecting upwardly from the rear side edge portion 24 and spaced apart along its length, a left restraining rib 36 projecting upwardly from a front part of the left side edge portion 26, and a right restraining rib 38 projecting upwardly from a front part of the left side edge portion 28.

Figure 2:
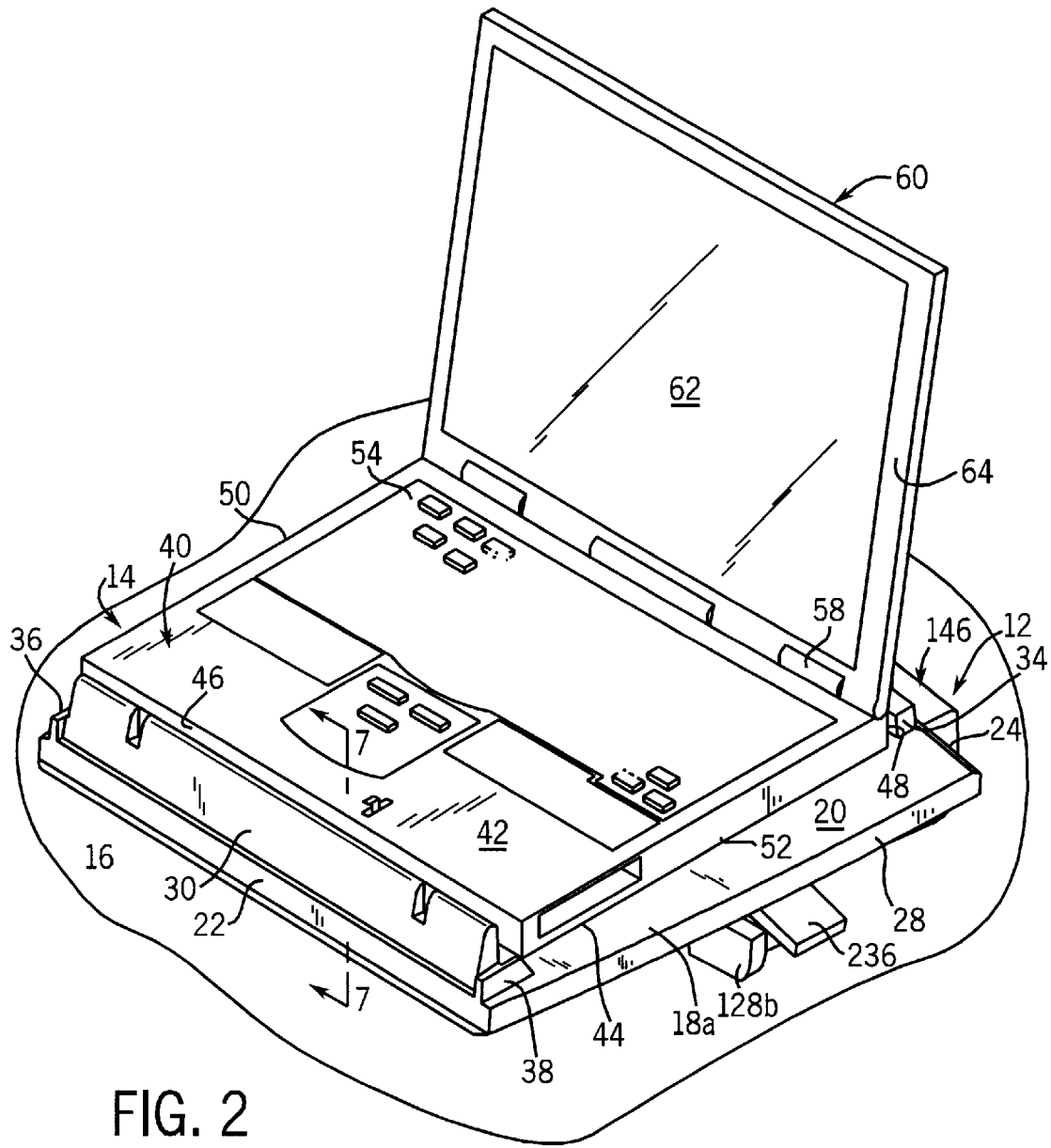
FIG. 2 is a perspective view of the docking station of FIG. 1 with a portable computer operatively docked thereto.

As illustrated in FIGS. 2 and 3, the notebook computer 14 has a rectangular base housing 40 with top and bottom sides 42 and 44, opposite front and rear sides 46 and 48, and opposite left and right ends 50 and 52. A keyboard 54 is operatively mounted on the top base housing side 42 (see FIG. 2), and an electrical docking connector socket 56 (see FIG. 3A) is recessed into a central portion of the rear side 48.

A hinge mechanism 58 located on a top rear corner portion of the computer base housing 40 secures a thinner rectangular lid housing 60 to the base housing. Lid housing 60 has a rectangular display screen 62 on its front or inner side 64.

The lid housing 60 is pivotable relative to the base housing 40 between an opened use position (shown in FIG. 2) in which the lid housing 60 is generally vertically oriented with the display screen 62 facing the user of the computer, and a closed storage and transport orientation (shown in FIG. 3) in which the lid housing 60 is swung downwardly to extend along and cover the top base housing side 42. A suitable latch mechanism (not shown) is operable to releasably retain the lid housing 60 in its closed position.

The inner side surfaces of the docking station retaining ribs 30,32,34,36,38 peripherally bound a rectangular receiving and holding area 66 disposed on the top side 20 of the upper docking station section 18a (see FIG. 1) and configured to complementarily receive the notebook computer base housing 40 when the notebook computer 14 is placed on the top side 20 prior to operatively coupling the computer 14 to the docking station 12 in a manner later described herein. When the notebook computer 14 is placed in the receiving and holding area 66 (see FIG. 2), the horizontally inner side surfaces of the ribs 30,32,34,36,38 define abutment surfaces that face corresponding side surfaces of the base housing 40 and preclude appreciable movement of the received computer 14 relative to the docking station 12 parallel to its top side 20.

With the received notebook computer 14 firmly restrained in this manner against horizontal front-to-rear and side-to-side movement relative to the docking station 12, the computer may be "docked" to the station 12 using a docking connector body 68 (see FIGS. 1, 3 and 3A) which, according to a feature of the present invention, projects upwardly past the docking station rear side edge portion 24 and is movable toward and away from the rear side 48 of the stationary base housing 40 in a front-to-rear direction as indicated by the double-ended arrow 70 in FIG. 3A.

Figure 4:
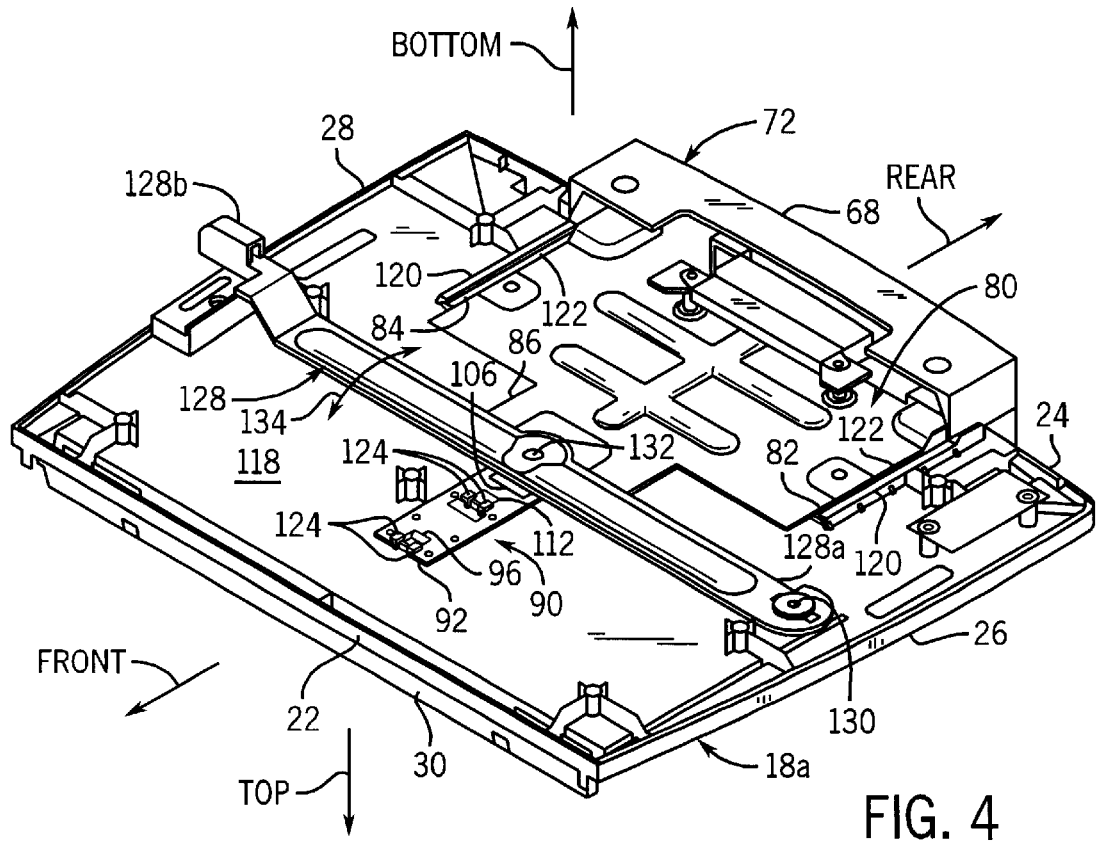
FIG. 4 is an enlarged scale bottom side perspective view of a top side portion of the docking station removed from the balance of the docking station and illustrating the structure and operation of the movable docking connector portion of the docking station.
Figure 5:
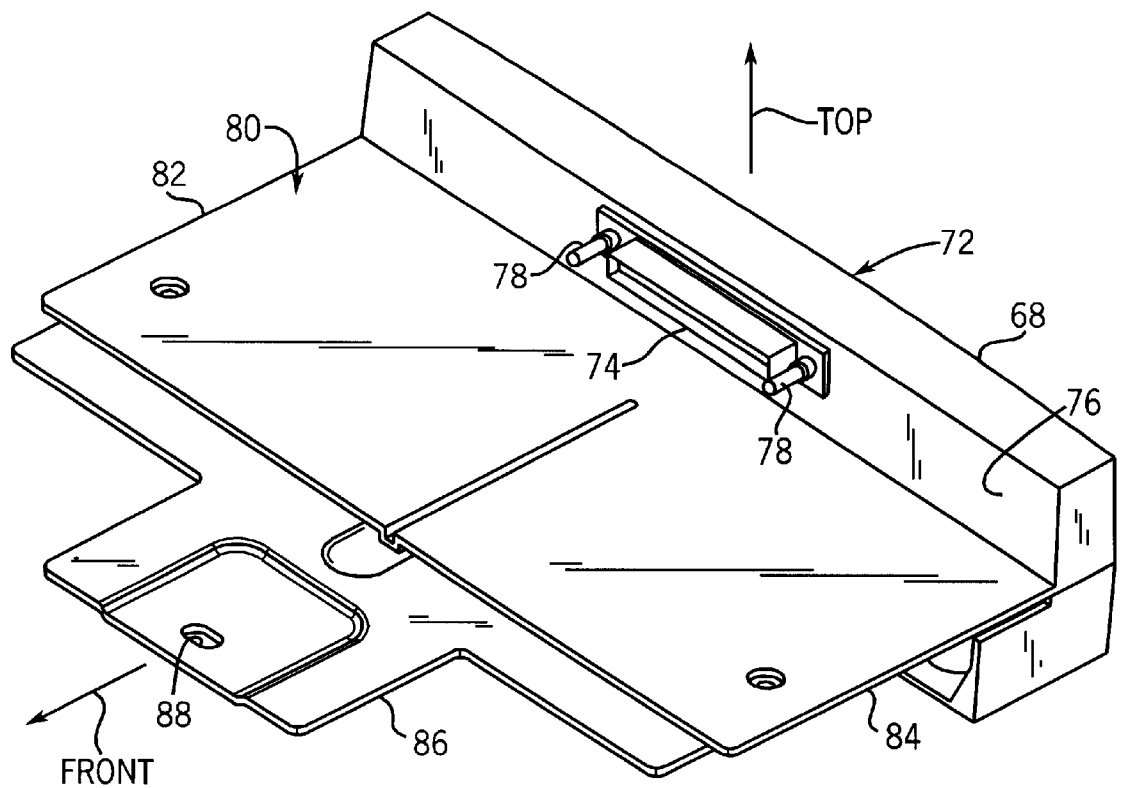
FIG. 5 is an enlarged scale top side perspective view of the movable docking connector portion.

Referring now to FIGS. 1, 4 and 5, the connector body 68 forms a portion of a specially designed movable docking connector structure 72 which includes a multi-pin electrical plug connector 74 projecting forwardly from a front upper side portion 76 of the connector body 68 and being flanked on its opposite ends by a pair of forwardly projecting guide pin members 78. Also projecting forwardly from the connector body 68, just below the connector 74, is a slide plate structure 80 (see FIG. 5) having opposite left and right side edges 82,84 and a forwardly projecting central front tab portion 86 having an oblong slot 88 formed in an outer end portion thereof.

An elongated rectangular security latch plate member 90 (see FIG. 6) is associated with the slide plate structure 80 as later described herein, and has front and rear ends 92 and 94, a front end notch 96 having opposite left and right side edges 98 and 100 and at the rear end of which a latch projection 102 upwardly extends and has a forwardly extending hook portion 104 on its upper end, a rectangular rear end opening 106 having front and rear edges 108 and 110, and a longitudinally central opening 112 having opposite left and right side edges 114,116.

Turning now to FIG. 4, which perspectively illustrates the bottom side 118 of the upper section 18a of the docking station housing 18, the slide plate structure 80 extends along the bottom side 118 and is slidably supported thereon, for forward and rearward movement relative thereto, by a parallel pair of elongated brackets 120 formed on the bottom side 118, spaced apart in a left-to-right direction, and longitudinally extending in front-to-rear directions. Brackets 120 define elongated grooves 122 that slidably receive the opposite left and right side edges 82,84 of the slide plate structure 80.

Figure 6:
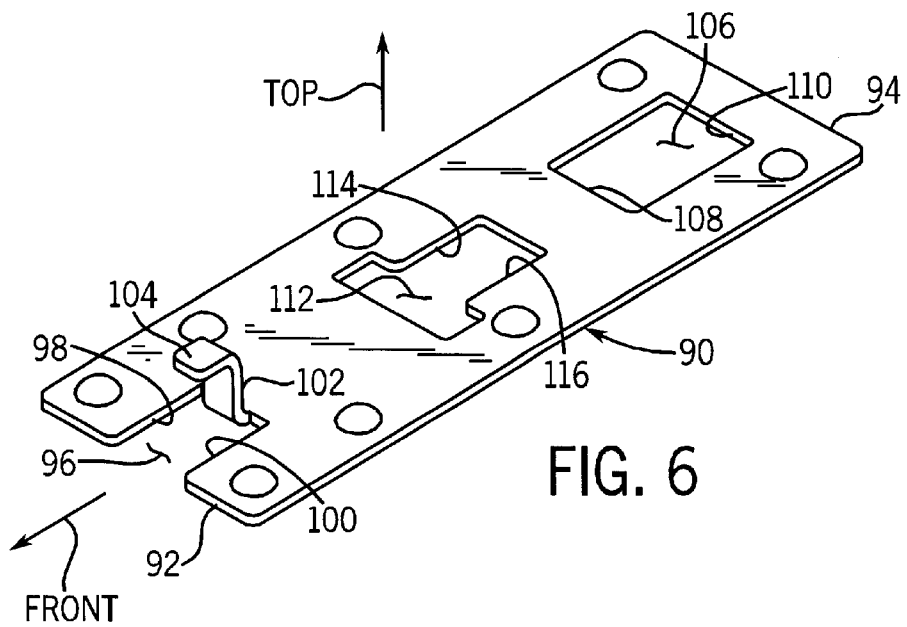
FIG. 6 is an enlarged scale top side perspective view of a slidable security latch member utilized in the docking station.

Still referring to FIG. 4, a rear end portion of the security latch plate 90 underlies the front tab portion 86 and is carried on the bottom side 118, for forward and rearward movement relative thereto, by generally L-shaped tabs 124 formed on the bottom side 118, extending downwardly through the latch plate openings 96 and 112, and slidably receiving the latch plate opening side edge portions 98,100 and 114,116 (see FIG. 6). The latch projection 102 projects upwardly through an opening 126 (see FIGS. 1 and 7) extending between the top and bottom sides 20,118 of the upper docking station housing section 18a and elongated in a front-to-rear direction.

The mechanism used to operatively couple the stationary notebook computer 14 to the docking station 12 also includes an elongated lever member 128 disposed on the bottom side 118 of the upper docking station housing section 18a as perspectively illustrated in FIG. 4. Lever member 128 has an inner end portion 128a pivotally connected, as at 130, to the upper housing section 18a adjacent its left side edge portion 26, and an outer end portion 128b that projects outwardly beyond a right side portion of the docking station housing 18. A drive pin 132 is suitably anchored to a longitudinally central portion of the lever 128 and extends upwardly therefrom into the slot 88 in the slide plate front tab portion 86 (see FIG. 5) and the rear end opening 106 of the security latch plate 90 (see FIG. 6).

Lever 128 is pivotable about its pivot location 130, as indicated by the double-ended arrow 134 in FIG. 4, between a forwardly pivoted docking position (see FIG. 3) in which the outer lever end 128b is moved to a forward limit position relative to the docking station housing 18, and a rearwardly pivoted undocking position (see FIG. 3A) in which the outer lever end 128b is moved to a rearward limit position relative to the docking station housing 18. Via the drive pin 132, forward pivoting of the lever 128 to its docking position correspondingly slides the latch plate 90, the slide plate 80 and the movable connector body 68 (see FIG. 3) forwardly to front limit positions thereof, and rearward pivoting of the lever 128 to its undocking position correspondingly slides the latch plate 90, the slide plate 80 and the movable connector body 68 (see FIG. 3A) to rear limit positions thereof.

To dock the notebook computer 14, the user grasps the outer lever end portion 128b and pushes it rearwardly to its FIG. 3A rear limit position, thereby rearwardly shifting the movable docking connector structure 72 relative to the housing 18 to its FIG. 3A undocking orientation. Computer 14 is then downwardly placed in the previously described receiving and holding area 66 (see FIG. 1) disposed on the top side of the docking station housing 18. This aligns the rear side computer connector socket 56 (see FIG. 3A) with the now rearwardly shifted connector plug 74 and associated guide pins 78.

Next, the user simply grasps the outwardly projecting outer lever end portion 128b and pulls it forwardly to its FIG. 3 docking position. This, in turn, forwardly drives the movable docking connector structure 72 relative to the stationary computer 14 to the FIG. 3 docking position of the connector structure 72 and causes the connector plug 74 to be forcibly and removably mated with the facing computer connector socket 56 (compare FIGS. 3 and 3A), with the guide pins 78 being received in corresponding guide openings (not shown) formed in the rear side of the computer adjacent opposite ends of the socket 56.

Figure 7:
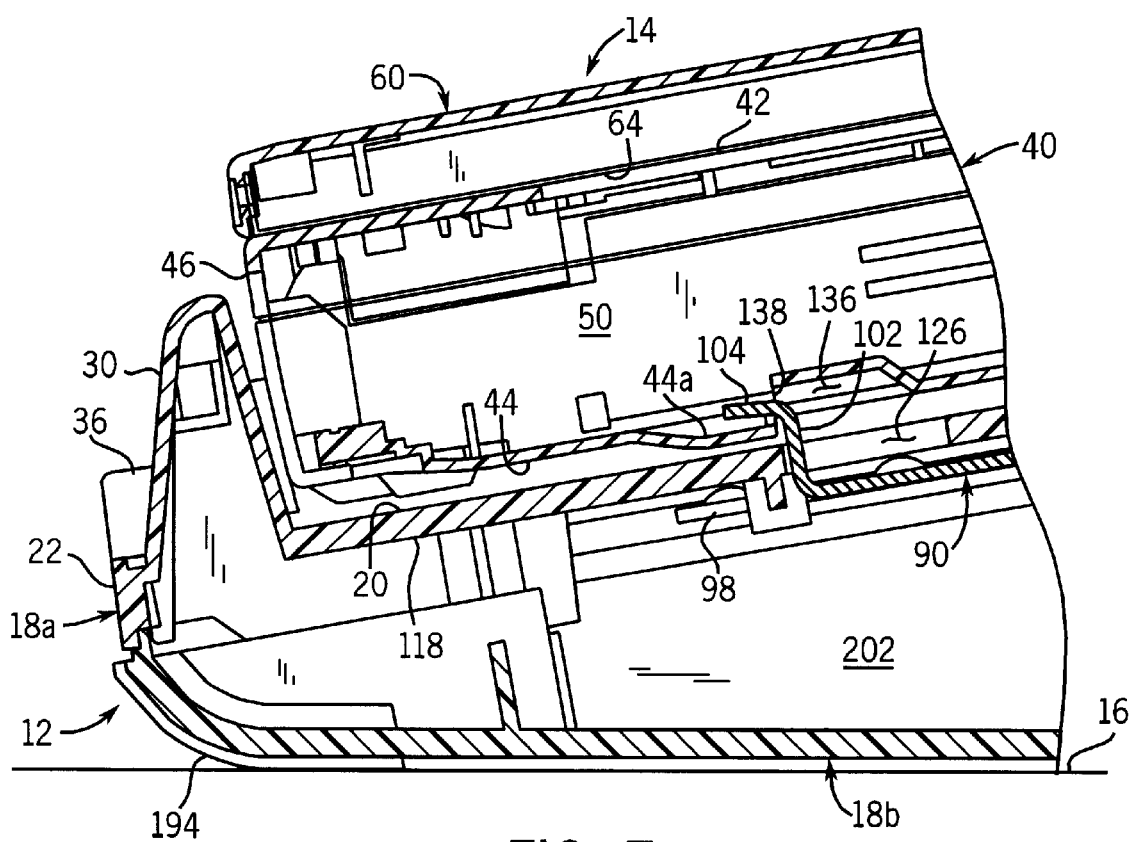
FIG. 7 is an enlarged scale partial cross-sectional view taken along line 7—7 through the portable computer and docking station shown in FIG. 2 and illustrating the operation of the slidable security latch member.

When the notebook computer 14 is initially placed in the receiving and holding area 66, with the lever 128 rearwardly pivoted to its undocking position, the latch hook 104 (see FIG. 7) which projects upwardly into the receiving and holding area 66 (see FIG. 1) upwardly enters a bottom side recess 136 formed in a front underside portion of the computer base housing 40 and extending rearwardly from a forwardly extending latching opening 138 (see FIG. 7) in the bottom side of the computer base housing 40. As the lever 128 is forwardly pivoted to effect the docking of the computer 14, the latch plate 90 is forwardly shifted to thereby cause the latch hook portion 104 to forwardly enter the computer underside latching opening 138 as shown in FIG. 7. In this forwardly shifted orientation of the latch plate 90, the hook 104 overlies a downwardly offset bottom base housing wall portion 44a to thereby prevent a front portion of the computer 14 from being lifted upwardly out of the receiving and holding area 66.

As illustrated in FIG. 3A, a small Kensington lock opening 140 is formed in the right side wall of the lower docking station housing section 18b adjacent the outer lever end 128b. When the outer lever end 128b is moved to its FIG. 3 docking position, a Kensington lock 144 may be inserted into the opening 140 and locked to the docking station 12. The attached lock 144 prevents the rearward movement of the outer lever end 128b from its FIG. 3 position. This, in turn, prevents the rearward undocking shifting of the movable docking connector structure 72 and the rearward shifting of the latch plate 90 from its FIG. 7 position. Accordingly, the in-place lock 144 prevents the removal of the docked notebook computer 14 from the docking station 12.

To undock the notebook computer 14, the lock 144 is simply removed, and the outer lever end 128a is pushed rearwardly from its FIG. 3 docking position to its FIG. 3A undocking position, thereby rearwardly uncoupling the movable connector plug 74 (see FIG. 3A) from the stationary computer connector socket 56, and also rearwardly shifting the latch plate 90 to rearwardly withdraw its hook portion 104 from the computer latching opening 138 (see FIG. 7) and permit the now undocked notebook computer 14 to be lifted out of the docking station top side receiving and holding area 66. While the mating docking connectors have been representatively illustrated as being a plug on the docking station and a socket on the computer, it will be readily appreciated that other types of mating electrical connectors could be alternatively utilized if desired.

The docking station 12 also includes an elevational adjustment member which is representatively in the form of an adjustment foot 146 that is pivotally secured to the docking station housing 18. Foot 146 is useable in a manner later described herein to adjust the front-to-rear tilt angle of the docking station 12 (and the notebook computer 14 docked thereto) relative to the horizontal support surface 16 among a series of varying tilt orientations including a generally horizontal minimum tilt orientation shown in FIG. 3 and a maximum tilt orientation shown in FIG. 8.

When the notebook computer 14 is operatively coupled to the docking station 12 as previously described, the resulting mating of the movable docking station connector 74 and the stationary computer connector 56 appropriately couples the schematically depicted computer circuitry 148 (see FIG. 3) to schematically depicted interface circuitry 150 operatively disposed within the interior of the docking station housing 18. As best illustrated in FIG. 9A, foot member 146 is of a hollow construction and has (as viewed in FIG. 9A) top and bottom sides 152 and 154, a hollow cylindrical front side portion 156, a rear side 158, and opposite left end right ends 160 and 162.

To facilitate the connection of various desktop peripheral devices to the docking station 12, and thus to the docked notebook computer 14, various connection ports are mounted on the support foot 146. These connection ports include (1) audio, microphone, headphone and DC power connection ports 164,166,168,170 carried on the left end of the support foot 146; (2) monitor, printer and serial ports 172,174,176 carried on the top side 152 of the support foot 146; and (3) mouse, keyboard, USB and RJ45 ports 178, 180,182,184 carried on the right end 162 of the support foot 146. These peripheral connection ports are operatively coupled to the docking station interface circuitry 150 by various leads 186 connected to the connection ports and extended through the interior of the support foot 146 to the interface circuitry 150.

Figure 8:
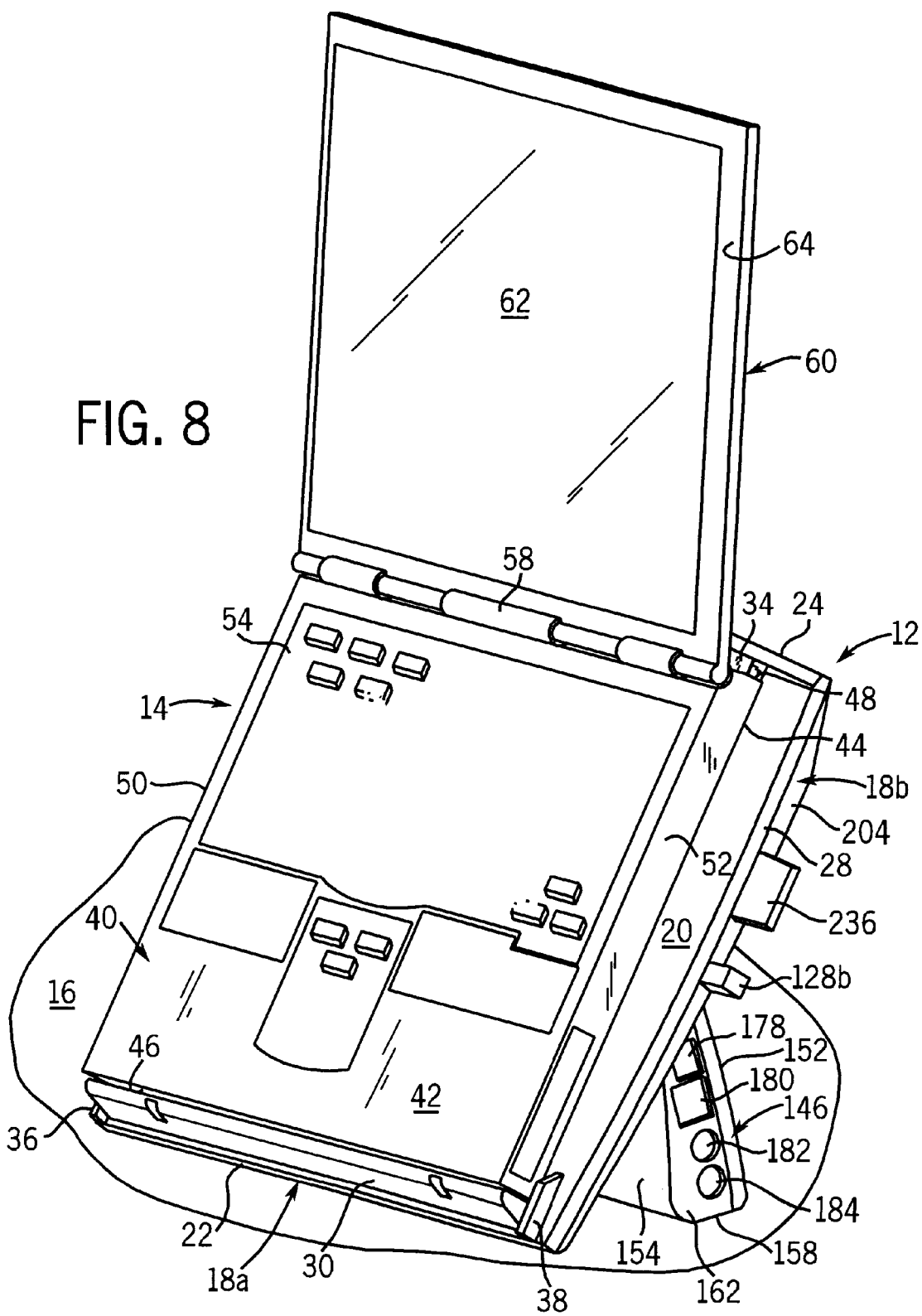
FIG. 8 is a view similar to that in FIG. 2, but with the docking station and the portable computer being in a pivotally raised orientation.
Figure 9:
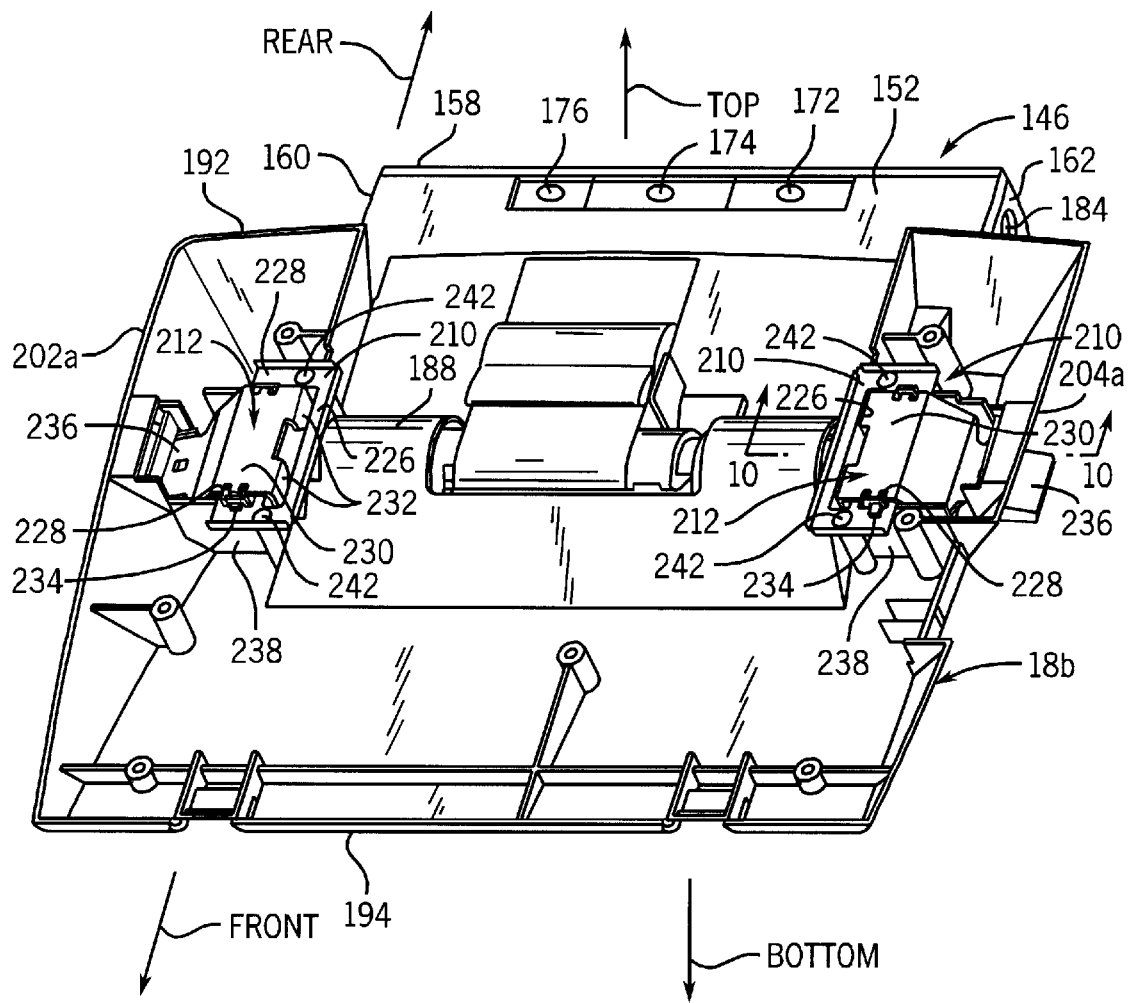
FIG. 9 is an enlarged scale top side perspective view of a bottom portion of the docking station removed from the balance thereof and illustrating an assembled, clutch-based pivotal elevation system incorporated in the docking station and embodying principles of the present invention.
Figure 9A:
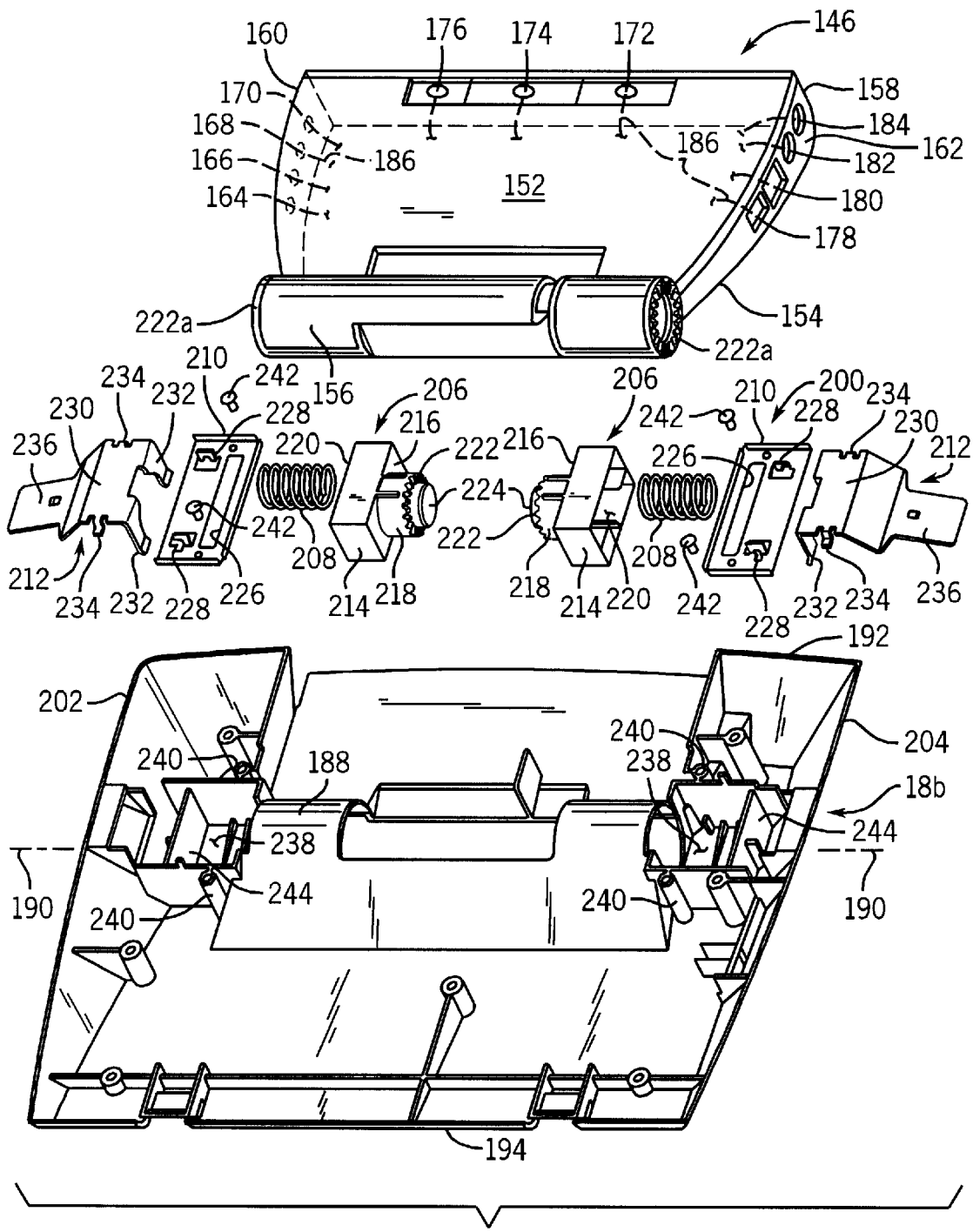
FIG. 9A is an exploded perspective view of the pivotal elevational system and the associated bottom portion of the docking station

Turning now to FIGS. 9 and 9A, the bottom docking station housing section 18b has an elongated, semicircularly cross-sectioned mounting portion 188 which is open on its bottom side and longitudinally extends along a horizontal axis 190 (see FIG. 9A) which is parallel to the rear side 192 of the bottom docking station housing section 18b and is forwardly offset from the rear side 192 approximately one third of the total distance between the rear side 192 and the front side 194 of the bottom docking station housing section 18b. A top side portion of the hollow cylindrical front side portion 156 of the support foot 146 is upwardly received in the mounting portion 188, and captively retained therein as later described herein, in a manner permitting the support foot 146 to pivot about the axis 190 relative to the docking station housing 18 between the support foot pivotal limit positions shown in FIGS. 3 and 8.

When the support foot 146 is in its FIG. 3 minimum pivotal limit position, the support foot side surface 154 contacts the desktop surface 16 in a manner causing the support foot 146 to prop the docking station 12 and docked notebook computer 14 up at a rearwardly and upwardly inclined tilt angle of approximately ten degrees relative to the desktop surface 16. When the support foot 146 is in its FIG. 8 maximum pivotal limit position, the support foot side surface 158 contacts the desktop surface 16 in a manner causing the support foot 146 to prop the docking station 12 and docked notebook computer 14 up at a rearwardly and upwardly inclined tilt angle of approximately 60 degrees relative to the desktop surface 16. In a manner later described herein, the support foot 146 may be releasably locked in these two pivotally adjusted positions, and in several other pivotally adjusted positions therebetween, to selectively vary the tilt angle of the docking station 12 and the notebook computer 14 docked thereto. This pivotal adjustment capability provides the docking station 12 with two primary advantages over conventional fixed orientation docking stations.

First, with the docked computer display housing 60 opened to a generally vertical orientation as illustrated in FIG. 8 and being used instead of a desktop monitor, the viewing height of the display screen 62 may be selectively varied (to suit users of varying heights) simply by pivotally adjusting the support foot 146 to correspondingly vary the tilt angle of the docking station 12. Due to the positioning of the foot pivot axis 190 (see FIG. 9A) forwardly of the rear side of the docking station housing approximately one third of the front-to-rear distance between the front and rear sides of the docking station housing, if the foot 146 is kept in stationary contact with the desktop surface 16 and the housing 18 is pivoted relative to the foot 146 to effect the housing tilt angle change, the vertical distance of the display screen 62 above the desktop surface 16 may be conveniently adjusted without substantially changing the horizontal distance between the user and the display screen 62. Second, when the display screen 62 is being utilized in lieu of a desktop computer monitor, the ability to pivot the docking station 12 upwardly substantially reduces the vertical footprint of the docking station/portable computer assembly 12,14 on the desktop work surface 16.

Figure 10:
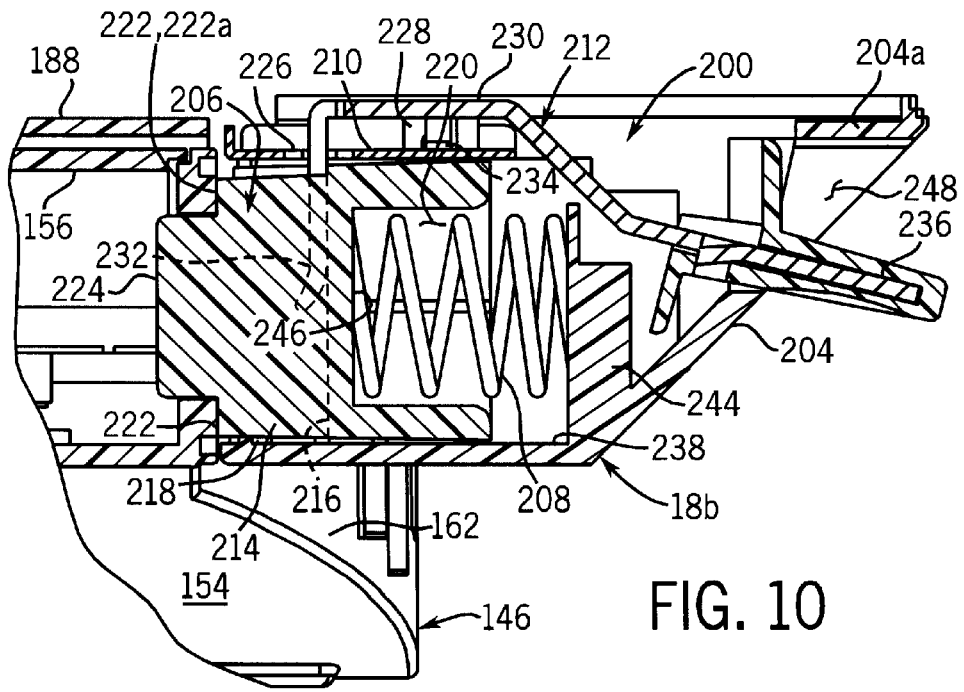
FIG. 10 is an enlarged scale cross-sectional view taken through a lower housing part of the docking station along line 10—10 of FIG. 9 and illustrating a portion of the spring-loaded clutch apparatus in the pivotal elevation system, with the clutch apparatus being in its operatively engaged orientation.
Figure 10A:
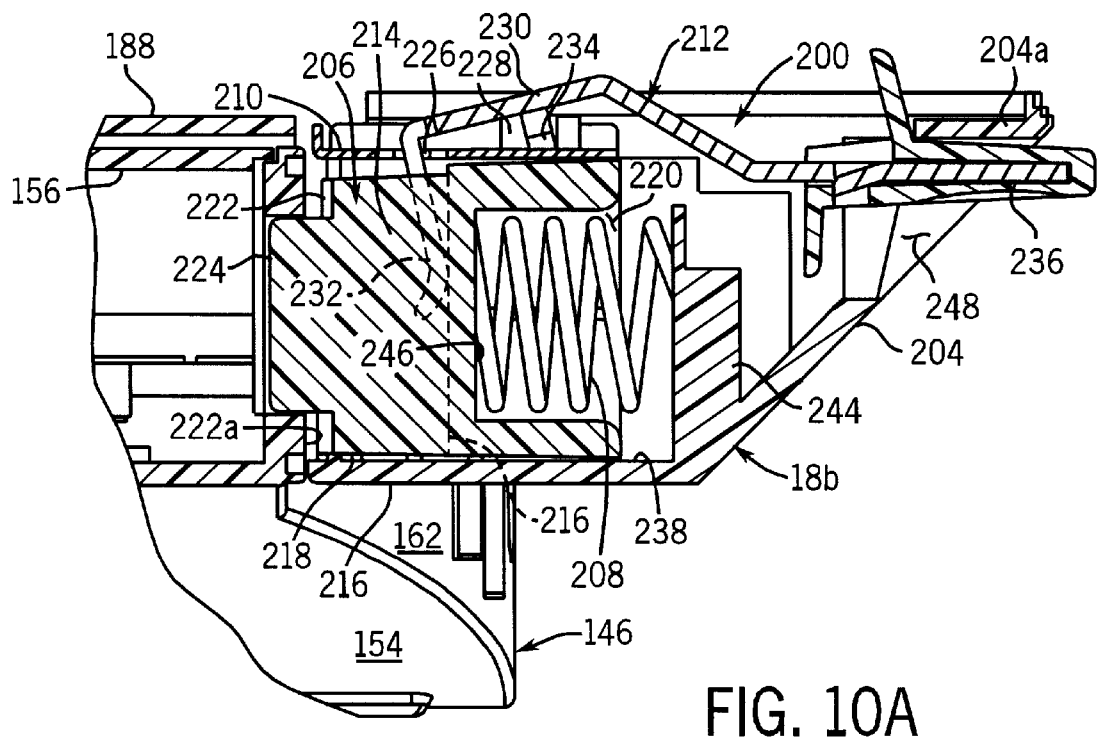
FIG. 10A is a view similar to that in FIG. 10, but with the clutch apparatus being manually moved to its disengaged orientation.

Turning now to FIGS. 9–10A, the pivotally adjustable support foot 146 is releasably lockable in any selected one of its various pivotal orientations relative to the docking station housing 18 by means of a specially designed clutch system 200 that includes, on each of the left and right side edge portions 202,204 of the bottom docking station housing section 18b, a clutch member 206, a cylindrical coiled compression spring 208, a retaining plate 210, and a drive lever plate member 212.

As best illustrated in FIG. 9A, each clutch member 206 has a rectangular body 214 with a front side 216 from which a cylindrical portion 218 outwardly projects, and a cavity 220 formed in its rear side. An annular array of clutch teeth 222 is disposed on the outer end of the cylindrical portion 218 and circumscribes a smaller diameter cylindrical mounting boss 224 projecting outwardly beyond the teeth 222. Each retaining plate 210 has an elongated slot 226 therein and a spaced apart pair of upstanding pivot support brackets 228. Each drive lever plate 212 has an inner end portion 230 from which a spaced pair of drive fingers 232 depend, a pair of pivotal support projections 234 disposed on opposite side edges of the inner end portion 230, and a downwardly offset outer end portion 236.

With reference now to FIGS. 9–10A, the opposite ends of the hollow cylindrical front side portion 156 of the support foot 146 have annular arrays of clutch teeth 222a which are complementarily configured relative to the clutch teeth 222 on the clutch members 206. The clutch members 206 are slidably received in open-topped well areas 238 formed in the bottom docking station housing section 18b adjacent its left and right side edge portions 202 and 204. Retaining plates 210 overlie the clutch members 206 and captively retain them in the wells 238, with the retaining plates 210 being removably secured to housing bosses 240 with screws 242. The clutch member cylindrical portions 218 face one another and project outwardly through the wells 238, with the bosses 224 being rotatably received in the opposite ends of the support foot cylindrical side portion 156 and the clutch teeth 222,222a being releasably mated with one another.

The compression springs 208 are also received in the wells 238 and bear at their opposite ends on outer well wall sections 244 and the inner side surfaces 246 of the clutch member body cavities 220, thereby resiliently biasing the clutch members 206 toward one another, resiliently holding the clutch teeth 222,22a in meshed engagement with one another, and resiliently holding the clutch member bosses 224 in the ends of the support foot side portion 156 to thereby captively and pivotally retain the foot member 146 on the docking station housing 18.

The drive lever inner end portions 230 overlie the retaining plates 210, with the drive lever support projections 234 being pivotally received in the retainer plate support brackets 228 and the drive fingers 232 extending downwardly through the retainer plate slots 226, straddling the cylindrical clutch portions 218, and bearing against the facing side surfaces 220 of the rectangular clutch member bodies 214. With the support foot member 146 adjusted to a desired pivotal position relative to the docking station housing 18, the clutch system 200 assumes its FIG. 10 position, with the outer drive lever end portions 236 extending outwardly through openings 248 in the opposite left and right side edge portions 202,204 of the bottom docking station housing section 18b and downwardly offset from upper lip sections 202a,204a of the side edge portions 202,204.

When it is desired to change the pivotal orientation of the support foot member 146 relative to the docking station housing 18, the user simply pinches the outwardly projecting lever portions 236 upwardly against the housing edge lip sections 202a,204a (see FIG. 10A). This pivots the levers 212 about their pivot projections 234 (compare FIG. 10A to FIG. 10) to thereby drive the clutch members 206 away from one another, compress the springs 208, and disengage the clutch member teeth 220 from the teeth 220a on the opposite ends of the support member side portion 156. This, in turn allows the foot member 146 and the docking station housing 18 to be pivotally adjusted relative to one another to another pivotal orientation at which time the user simply releases the lever ends 236 to permit the springs 208 to drive the clutch members 206 back toward one another, thereby re-engaging the clutch teeth 222 with the clutch teeth 222a and again releasably locking the support foot 146 against pivotal movement relative to the docking station housing 18.

Representatively, the support foot 146 is pivotally adjustable in twenty degree increments between its FIG. 3 minimum limit orientation and its FIG. 8 maximum limit orientation, thereby illustratively providing the docking station 12 and the docked notebook computer 14 with seven different available tilt angles. It will, of course, be readily appreciated that the docking station 12 could be provided with more or fewer available tilt orientations if desired, that a tilt adjustment member other than the pivotally mounted support member 146 could be used if desired, and a clutch system configured differently than the clutch system 200 could be utilized if desired.

It should also be noted that the configuration of the top side of the docking station 14 which, as previously described, holds the notebook computer 14 stationary while the docking station connector structure 72 is moved relative to the computer to effect docking and undocking, facilitates the docking and undocking of the computer even while the docking station is upwardly and rearwardly tilted at a substantial angle. For example, during docking, the front restraining rib 30 (see FIG. 8) braces the computer 14 to receive the docking force of the moving docking station connector structure 72 and also prevents gravity from subsequently causing an undocking movement of the upwardly and rearwardly tilted computer 14. Further, the rear restraining ribs 32 and 34 (see FIG. 1) brace the computer 14 against the rearward undocking force created thereon during rearward movement of the docking station connector structure 72 relative to the computer.

The foregoing detailed description is to be clearly understood as being given by way of illustration and example only, the spirit and scope of the present invention being limited solely by the appended claims.

What is claimed is:

1. A docking station for use in operatively coupling a portable computer to a desktop computer peripheral device, the portable computer having a first electrical docking connector structure, said docking station comprising:

a housing having a wall portion with an area upon which the portable computer may be supported;

a holding structure associated with said wall portion and operative to stationarily restrain the supported portable computer against appreciable movement relative to said housing parallel to said wall portion area;

a second electrical docking connector structure releasably mateable with the first electrical docking connector structure and carried by said housing for movement relative thereto toward and away from said wall portion area; and a force exerting structure linked to said second electrical docking connector structure and operative to selectively drive it relative to said housing into and out of mating engagement with the first electrical docking connector structure of the supported portable computer when it is stationarily restrained on said wall portion area by said holding structure.

2. The docking station of claim 1 wherein:

said second electrical docking connector structure is movable relative to said housing in directions parallel to said wall portion area.

3. The docking station of claim 1 wherein:

the portable computer has a base housing, said wall portion is a top side wall portion of said docking station housing and has peripheral edge portions, and said holding structure includes upwardly projecting rib structures disposed on said peripheral edge portions and bounding with said wall portion area an open-topped receiving area configured to downwardly and complementarily receive the portable computer base housing.

4. The docking station of claim 3 wherein:

said top side wall portion has a generally rectangular shape with front, rear, left and right side edge portions, and said rib structures project upwardly from each of said front, rear, left and right side edge portions.

5. The docking station of claim 4 wherein:

said second electrical docking connector structure is positioned at said rear side edge portion and is forwardly and rearwardly movable toward and away from said receiving area.

6. The docking station of claim 1 wherein:

said force exerting structure includes a manually operable lever member pivotally connected to said housing and drivingly coupled to said second electrical docking connector structure.

7. The docking station of claim 6 wherein:

said lever member has a manually graspable outer end portion projecting outwardly from said housing and being movable between docking and undocking limit positions.

8. The docking station of claim 7 wherein:

said housing has an exterior lock opening positioned adjacent said lever member outer end portion and to which a lock member may be connected to block movement of said lever member outer end portion from said docking limit position to said undocking limit position.

9. The docking station of claim 1 further comprising:

a security latch member linked to said second electrical docking connector structure for driven movement therewith relative to said housing, said security latch member being operative to engage the stationarily supported portable computer and releasably prevent its removal from said wall portion area, in a direction transverse thereto, when said second electrical docking connector structure is releasably mated with the first electrical docking connector structure.

10. The docking station of claim 1 wherein:

said housing is restable on a horizontal support surface, and said docking station further comprises a tilt adjustment mechanism movably carried by said housing and engageable with the support surface in a manner selectively varying the angle of said wall portion relative to the support surface.

11. A docking station for use in operatively coupling a portable computer to a desktop computer peripheral device, the portable computer having a base housing and a first electrical docking connector structure, said docking station comprising:

a docking station housing with a top wall atop which the portable computer base housing may be supported, said top wall having peripheral side edge portions;

a holding structure associated with said top wall and operative to stationarily restrain the supported portable computer against appreciable movement relative to said docking station housing parallel to said top wall, said holding structure including upwardly projecting rib structures disposed on said peripheral side edge portions and bounding with said top wall an open-topped receiving area configured to downwardly and complementarily receive the portable computer base housing;

a second electrical docking connector structure releasably mateable with the first electrical docking connector structure and carried by said docking station housing for movement relative thereto toward and away from said receiving area;

a force exerting structure linked to said second electrical docking connector structure and operative to selectively drive it relative to said docking station housing into and out of mating engagement with the first electrical docking connector structure of the supportable portable computer when it is stationarily restrained on said top wall by said holding structure; and a security latch member linked to said second electrical docking connector structure for driven movement therewith relative to said docking station housing, said security latch member being operative to engage the stationarily supported portable computer and releasably prevent its upward removal from said receiving area when said second electrical docking connector structure is releasably mated with the first electrical docking connector structure.

12. The docking station of claim 11 wherein:

said top wall has a generally rectangular shape with front, rear, left and right side edge portions, and said rib structures project upwardly from each of said front, rear, left and right side edge portions.

13. The docking station of claim 12 wherein:

second electrical docking connector structure is positioned at said rear side edge portion and is forwardly and rearwardly movable toward and away from said receiving area.

14. The docking station of claim 11 wherein:

said force exerting structure includes a manually operable lever member pivotally connected to said housing and drivingly coupled to said second electrical docking connector structure.

15. The docking station of claim 14 wherein:

said docking station housing has an exterior lock opening positioned adjacent said lever member outer end portion and to which a lock member may be connected to block movement of said lever member outer end portion from said docking limit position to said undocking limit position.

16. The docking station of claim 11 wherein:

said docking station housing is restable on a horizontal support surface, and said docking station further comprises a tilt adjustment mechanism movably carried by said docking station housing and engageable with the support surface in a manner selectively varying the angle of said wall portion relative to the support surface.

17. A method of operatively coupling a portable computer to a desktop computer peripheral device, the portable computer having a first electrical docking connector structure thereon, said method comprising the steps of:

providing a docking station having a housing portion and a second electrical docking connector structure carried by said housing portion for movement relative thereto and being releasably mateable with said first electrical docking connector structure, and a force exerting structure operative to move said second electrical docking connector structure relative to said housing portion;

supporting said portable computer on a wall of said housing portion;

restraining the supported portable computer against appreciable movement relative to said housing portion parallel to said wall; and using said force exerting structure to move said second electrical docking connector structure toward the stationarily supported portable computer in a manner releasably mating said second electrical docking connector structure with said first electrical docking connector structure.

18. The method of claim 17 further comprising the step of:

releasably latching said portable computer to said housing portion, at a location spaced apart from the releasably mated first and second electrical docking connector structures, in response to releasably mating said first and second electrical docking connector structures.

19. The method of claim 18 wherein:

said wall of said housing portion is a top side wall thereof and has peripheral edge portions from which restraining ribs upwardly project, said restraining ribs defining with said top side wall an open-topped holding area configured to complementarily receive said portable computer, and said supporting and restraining steps are performed by downwardly placing said portable computer within said holding area.

20. The method of claim 19 wherein:

said top side wall has front, rear, left and right peripheral edge portions, each of which has at least one of said restraining ribs thereon, and said using step is performed in a manner forwardly moving said second electrical docking connector structure toward said first electrical docking connector structure.

* * * * *